June 15, 1954     A. H. LONG     2,681,106
CUTOFF MACHINE

Filed Dec. 8, 1949     4 Sheets-Sheet 1

INVENTOR.
ARTHUR H. LONG
BY
HIS ATTORNEY.

June 15, 1954   A. H. LONG   2,681,106
CUTOFF MACHINE
Filed Dec. 8, 1949   4 Sheets-Sheet 2

INVENTOR.
ARTHUR H. LONG
BY
HIS ATTORNEY

June 15, 1954　　A. H. LONG　　2,681,106
CUTOFF MACHINE

Filed Dec. 8, 1949　　4 Sheets-Sheet 3

INVENTOR.
ARTHUR H. LONG
BY
William D. Carrothers
HIS ATTORNEY

June 15, 1954 A. H. LONG 2,681,106
CUTOFF MACHINE
Filed Dec. 8, 1949 4 Sheets-Sheet 4

INVENTOR.
ARTHUR H. LONG
BY
HIS ATTORNEY

Patented June 15, 1954

2,681,106

UNITED STATES PATENT OFFICE 2,681,106

CUTOFF MACHINE

Arthur H. Long, Pittsburgh, Pa., assignor to Wm. K. Stamets Company, Pittsburgh, Pa., a corporation of Pennsylvania Application December 8, 1949, Serial No. 131,740

3 Claims. (Cl. 164—60)

This invention relates generally to machine tools and particularly to machines for cutting off lengths of pipe stock.

This cutoff machine may be operated in conjunction with a measuring control apparatus to cut off predetermined lengths of stock. The pieces cut from the stock are usually of predetermined lengths but consecutive pieces may be made of different lengths through control of the measuring device. Pipe stock is fed to the cutoff machine where it is clamped and a symmetrical arrangement of rotary discs are then fed radially into the stock and are revolved as they cut into the material. The discs are preferably mounted to idly rotate on their axis and groove the pipe before finally severing it. The cutting discs prevent the formation of external burrs and leave the pipe end with a uniform edge that may be readily chamfered and threaded inside or out. If the section or end of the pipe that is cut off is merely the crop end, a slide directs it to a conveyor which moves it from the vicinity of the machine. The cutoff lengths, however, are conveyed from the machine by the outlet table where they are discharged laterally and stored.

Other objects and advantages appear in the following description and claims.

The accompanying drawings show, for the purpose of exemplification without limiting the invention or claims thereto, certain practical embodiments of the invention wherein:

The cutoff machine shown and described is a dual machine designed to function as a unit with their controls interlocked or as separate machines functioning independently as a single unit.

Figure 1:
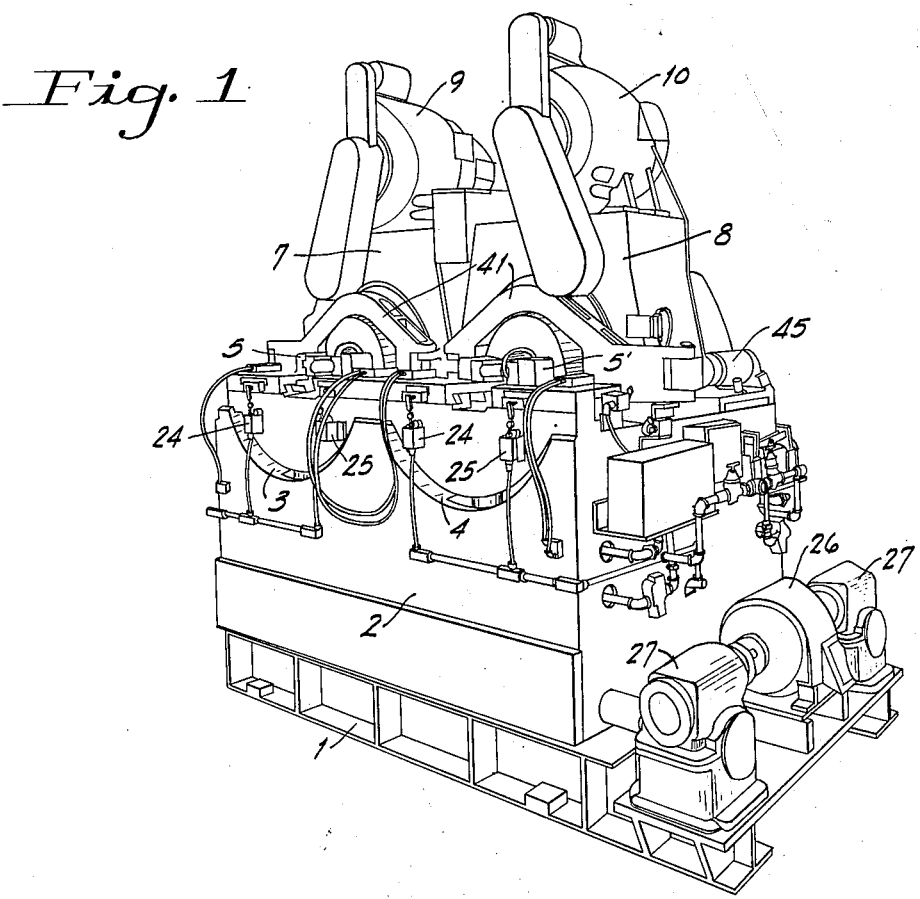
Fig. 1 is a perspective view of the cutoff machine showing the front end thereof.
Figure 2:
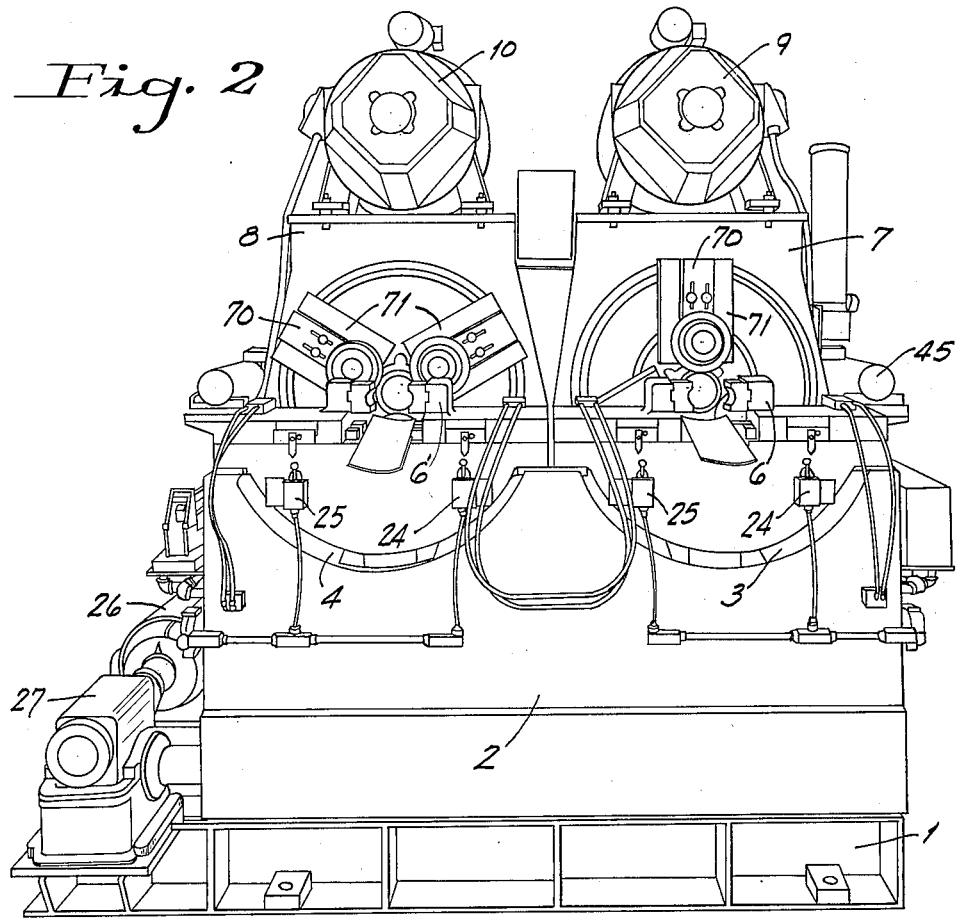
Fig. 2 is a view of the rear elevation of the cutoff machine showing the cutting heads.

Referring to Figs. 1 and 2, the cutoff machine is mounted on the sub base 1 which supports the box-like base member 2 provided with a plurality of spaced troughs 3 and 4 in which are cradled the fore and aft chucks 5, 5', 6 and 6'. Intermediate the chucks 5 and 6 the cutoff mechanisms 7 and 8 are mounted within the cradles and are provided with the independent motors 9 and 10 for operating the same which are mounted above the cutoff mechanism.

Figure 4:
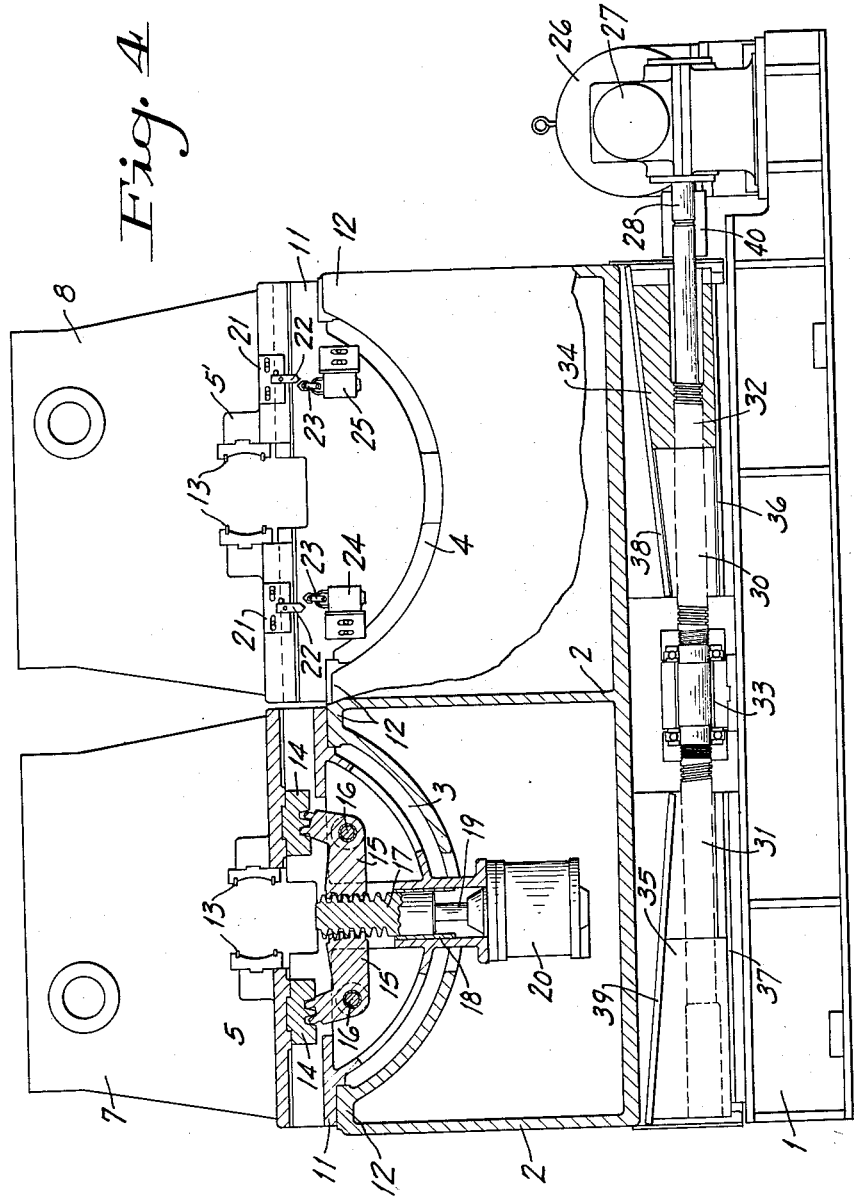
Fig. 4 is a front view in elevation, with parts shown in section, illustrating the fore clamp and the adjusting wedge.

As shown in Figs. 1, 2 and 4, the chuck castings 11 straddle their respective cradle pads 12 and are bolted thereto. Each of these chuck castings is provided with a slide member having a chuck grip 13 on the inner end thereof and provided with a rack 14 on the underside. The rack 14 is engaged by the geared sector on the end of the bell crank lever 15 pivoted on the shaft 16 carried by the casting 11. The other leg of each bell crank arm is provided with a geared sector, both of which register with the double-faced piston rack 17. The piston rack is actuated in a bearing guide 18 and has connected at its lower end the piston rod 19 that connects with a pneumatic piston operating within the cylinder 20. The chuck slides are provided with a limit switch trip bracket 21 each carrying a cam member 22 for striking and actuating the levers 23 of the limit switches 24 and 25. When the slide arms are actuated to grip the pipe, the switch 24 is actuated. The switch 25 is actuated when the slides are being retracted from their gripping position. These switches 24 and 25 are shown in Figs. 1 and 2, there being one set for each chuck or clamp of this dual cutoff machine. When this machine is in full operation and both units are running, the switches 24 are connected in series and the switches 25 are also connected in series for the purpose of maintaining the operation of this dual cutoff machine in step.

The closing of the slides carrying the gripping jaws to clamp a piece of pipe operates the switches 24 to energize a rapid traverse forward valve in the hydraulic circuit feeding the fluid motor 45 for rapidly moving the rotary cutters up to the pipe for cutting off the same. Upon retraction of the gripping jaw slides to unclamp the pipe the switches 25 are actuated and energize the motors operating the table conveyor rolls to move the severed pieces of pipe out of their respective cutoff machines.

As shown in Figs. 1, 2 and 4, a motor 26 is mounted on the sub base 1 and has its shaft projecting from either side thereof to the adjacent gear reducing members 27, which in turn are provided with shafts 28 that extend laterally toward the machine as shown in Fig. 4. The shafts 28 are connected to the adjusting wedge screw 30 which has a right hand thread screw 31 and a left hand thread screw section 32 and is journaled intermediate of its ends in the bearing block 33 that is located in the center of the machine. One of these adjusting mechanisms is provided on each end of the machine and the threaded sections of the adjusting screw are threadably engaged in complementary threaded bores of the bearing blocks 34 and 35, respectively, which ride on the bearing plates 36 and 37 and their upper wedge-shaped surface riding on the wedge wearing plates 38 and 39. The shafts 28 extending from the speed reducers are coupled with the shaft 39 by means of the couplings 40. The motor 25 is a variable speed reversible motor which may be controlled remotely for the purpose of moving the wedge blocks 34 and 35 in or out, thereby raising or lowering the base casting 2 of the machine to raise or lower the cutting center of the machine relative to the tube support rolls in accordance with the size of stock to be worked on.

Figure 5:
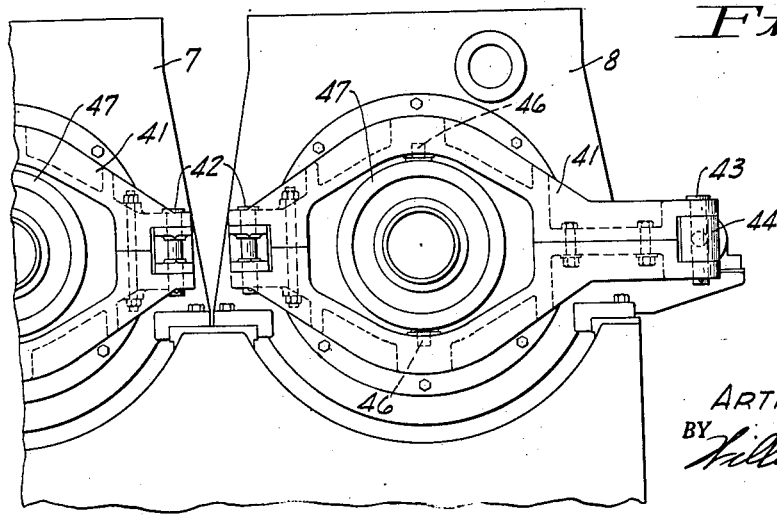
Fig. 5 is a view showing the feed yoke in elevation.
Figure 3:
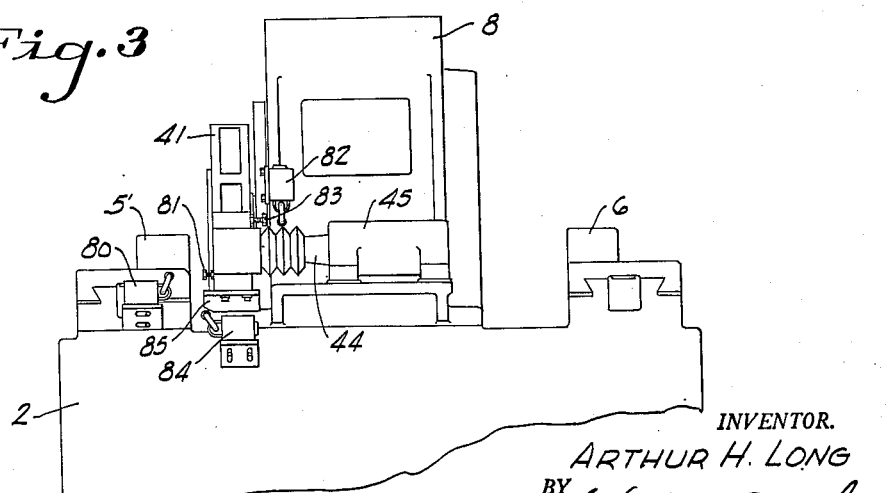
Fig. 3 is a view in side elevation of the cutoff machine.

As shown in Figs. 1, 3 and 5, the cutoff mechanism 8 is provided with the feed yoke or lever 41 that is pivotally supported by the pin 42 to the housing which extends laterally across the front of the cutoff mechanism and is provided with a pin 43 for the purpose of pivotally attaching the same to the end of the piston rod 44 that extends from the hydraulic cylinder 45. The piston 44 extends through a rubber bellows to keep it clean. The hydraulic cylinder 45 is double-acting and may be actuated at varying speeds for pivotally moving the yoke 41 on its pivotal axis.

Figure 6:
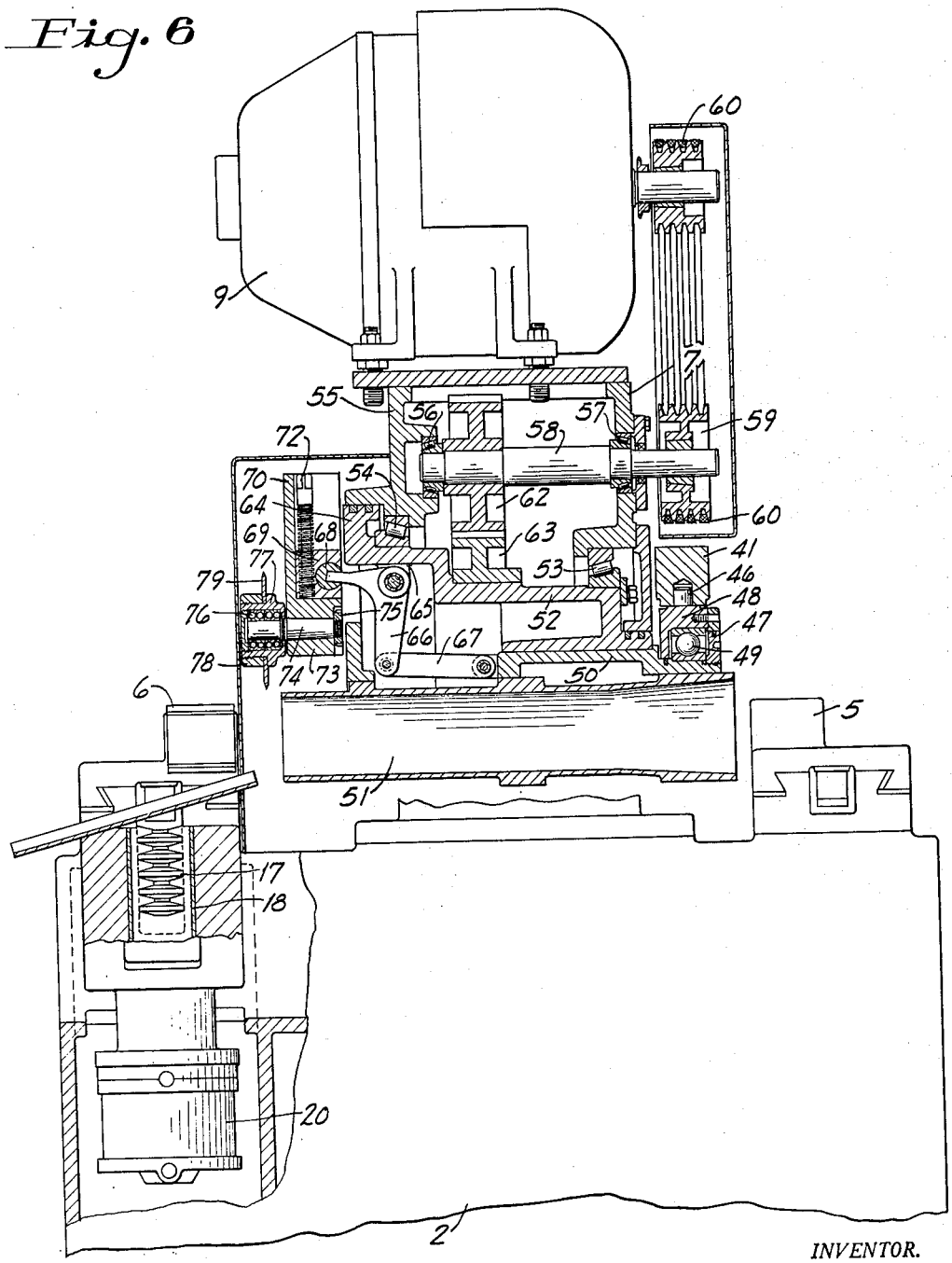
Fig. 6 is a sectional view of the cutter and its actuating mechanism.

Intermediate the ends of the feed yoke 41, is provided oppositely disposed sockets for receiving the pins 46 with clearance that extend radially from the feed bearing ring 47, as shown in Figs. 5 and 6. The annular bearing ring 47 is composed of the stationary member 48 that houses the antifrictional bearing 49 and the rotary feed slide body or sleeve 50. Thus, by actuating the hydraulic piston 45, the feed yoke 41 causes the bearing ring to move axially of the mechanism and thus reciprocate the rotary feed slide body 50. The rotary feed slide body 50 is an annular member mounted to slide longitudinally on the guide tube 51 which is likewise mounted for rotation and through which the stock extends when it is being cut off. The rotary feed slide body 50 is splined with the rotary head 52, the former operating in a bore of the latter. The head 52 is supported at its front end by the antifrictional bearing 53 and at its rear end by the antifrictional bearing 54 which is larger in diameter as shown in Fig. 6. These spaced antifrictional bearings 53 and 54 are mounted in the spindle housing 55 and suitable oil rings are provided to maintain a lubricant in their chambers in which the bearings and the gear mechanism operate as illustrated in Fig. 6.

The spindle housing 55 is likewise provided with aligned bearings 56 and 57 for receiving the shaft 58, the outer end of which extends outside of the spindle housing and is provided with a pulley 59 driven by the belts 60 from the motor 9. Intermediate of the bearings 56 and 57 the shaft 58 is provided with a double helical gear 62 that meshes with the large mating drive gear 63 mounted on the perimeter of the rotary head 52. Thus, rotary motion of the motor is transmitted through the several belts to the shaft 58 and thence by the gears 62 and 63 to the rotary head for rotating the whole of this mechanism.

The rotary head 52 is provided with a bell end 64 having a series of inwardly projecting lugs 65 spaced 120° apart for the purpose of carrying the pivot of the bell crank levers 66. One leg of the bell crank lever 66 is pivotally connected by the link 67 to the rotary feed slide body 50; whereas the other leg of the bell crank 66 is provided with a cylinder 68 seated in the socket of adjusting nut 69 that is attached to the tool slide 70. Three of such tool slides are provided for each cutting head which is obvious from Fig. 2. The tool slides 70 operate in the guides 71 and are reciprocable radially toward the center of the axis of the machine. An adjusting screw 72 is provided in each tool slide for changing the relative position of the nut 69 to the slide so as to permit relative adjustment of each tool carried by each tool slide.

The inner end of the tool slide 70 is provided with a socket 73 for receiving the tool shaft 74 that is locked in place by the nut 75 and carries on its outer end the bearing members 76 which rotatably support the cutter hub 77 that has a shoulder and a threaded section to receive the cutter nut 78 that supports and clamps the cutter disc 79 in place. The cutter disc 79 is freely rotatable on the bearing 76 supported by the shaft which itself rotates with the rotary head 52 about the central axis of the machine.

When a tube or other similar stock article is supported on the inlet table rolls of the cutoff machine, it may be fed through the guide tube 51 and when placed in its proper position the chucks 5 and 6 are actuated to bring the grips 13 to bear on the tube and hold it tightly in place. The rotary head 52 with its three disc cutters 79, each of which is properly adjusted, is set in motion and the hydraulic cylinder 45 is actuated to move the yoke 41 on its pivotal axis and withdraw the feed bearing ring 47 together with the cylindrical rotary feed slide body 50 out over the guide tube 51. This action creates a pull on the bell crank levers 66 through the links 67 and thus causes the three tool slides 70 to be fed radially inwardly permitting the cutter discs 79 to engage the pipe and cut it through since the cutting discs are revolving at a considerable speed. When the cutting discs have completely severed the pipe section, the automatic switch 80, in Fig. 3, is actuated to energize a rapid traverse reversing valve in the hydraulic circuit feeding the hydraulic cylinder 45 to rapidly retract the feed yoke and thus retract the cutting discs. The switch 80 is set to be engaged by the cam 81 when the yoke 41 is near the outer end of its stroke and the rotary cutting discs 79 are through the wall of the tube. This switch must be reset for different wall thicknesses of pipe. A rapid traverse is supplied to the cylinder 45 to return the yoke 41 which engages the switch 82 through its cam 83 to deenergize the rapid traverse reversing valve to stop the operation of the cylinder 45. The switch 24 permits the cylinder 45 to rapidly traverse in the direction of feed until the switch 84 operated by the cam 85 to de-energize the rapid traverse forward valve and at the same time energize the feed valve to change the speed of operation of the cylinder 45 to that of feed which is materially slower. Thus, the cam 85 is set for different sizes of pipe so that the machine has rapid traverse until the cutting discs 79 are just about to engage the pipe.

While, for clarity of explanation, certain preferred embodiments of this invention have been shown and described, it is to be understood that this invention is capable of many modifications, and changes in the construction and arrangement may be made therein and certain parts may be employed with conjoint use of other parts and

I claim:

1. A stock cutoff machine comprising a base, spaced antifriction bearings supported on said base, a hollow cylinder rotatably supported by said antifrictional bearings and having a head at one end and a splined bearing surface means in the bore at the other end, a plurality of slides mounted for radial movement on said head, a tool on each slide, a guide tube extending coaxially through said cylinder, radial members on said head supporting one end of said guide tube for rotation with said cylinder, spaced annular bearing surface means on the perimetral surface of said rotary guide tube and in opposed relation with said splined bearing surface means in the bore of said cylinder, a sleeve having an outer splined bearing surface to cooperate with the splined bearing surface in said cylinder and having corresponding spaced annular bearing surface means in the bore thereof to slidably engage and support the other end of said rotary guide tube, bell crank linkage pivoted on said head and connecting said slides with the inner end of said sleeve, a ring mounted for relative rotary movement on the outer end of said sleeve, control means to reciprocate said ring and said sleeve to feed the tools in and out to sever stock that extends through said guide tube.

2. The structure of claim 1 which also includes axially aligned and oppositely disposed clamp means supported on said base with one clamp means adjacent each end of said rotary guide tube to hold the stock being cut by said tools independently of said rotary guide tube.

3. The structure of claim 2 which also includes elevating means on said base to raise and lower the antifriction bearings relative to said clamp means to align the axes of the axis of said rotary guide tube with the aligned axes of a workpiece in said clamp means.

References Cited in the file of this patent

UNITED STATES PATENTS

| Number | Name | Date |
|---|---|---|
| Re. 20,154 | Baker | Nov. 3, 1936 |
| 1,111,336 | Wallace | Sept. 22, 1914 |
| 1,166,456 | Hamer | Jan. 4, 1916 |
| 1,592,169 | Wilkinson | July 13, 1926 |
| 2,326,463 | Johnston | Aug. 10, 1943 |

FOREIGN PATENTS

| Number | Country | Date |
|---|---|---|
| 101 | Great Britain | Jan. 9, 1880 |
| 290,451 | Great Britain | May 17, 1928 |